US012564924B2

(12) United States Patent
Zhao

(10) Patent No.: US 12,564,924 B2
(45) Date of Patent: Mar. 3, 2026

(54) FASTENER DRIVING TOOL

(71) Applicant: Illinois Tool Works Inc., Glenview, IL (US)

(72) Inventor: Hanxin Zhao, Northbrook, IL (US)

(73) Assignee: Illinois Tool Works Inc., Glenview, IL (US)

( * ) Notice: Subject to any disclaimer, the term of this patent is extended or adjusted under 35 U.S.C. 154(b) by 4 days.

(21) Appl. No.: 18/419,906

(22) Filed: Jan. 23, 2024

(65) Prior Publication Data

US 2024/0157531 A1 May 16, 2024

Related U.S. Application Data

(63) Continuation of application No. 17/961,283, filed on Oct. 6, 2022, now Pat. No. 11,897,104, which is a continuation of application No. 17/027,026, filed on Sep. 21, 2020, now Pat. No. 11,491,623.

(60) Provisional application No. 62/909,302, filed on Oct. 2, 2019.

(51) Int. Cl.
*B25C 1/00* (2006.01)
*B25C 1/18* (2006.01)

(52) U.S. Cl.
CPC ................ *B25C 1/008* (2013.01); *B25C 1/18* (2013.01)

(58) Field of Classification Search
CPC ...................................................... B25C 1/008
See application file for complete search history.

(56) References Cited

U.S. PATENT DOCUMENTS 3,467,294 A 9/1969 Fisher
3,479,926 A 11/1969 Hillier
3,572,572 A 3/1971 Readyhough
3,580,455 A 5/1971 Cast
3,583,496 A 6/1971 Fehrs
3,786,978 A 1/1974 Manganaro
3,888,404 A 6/1975 Ramspeck et al.
(Continued)

FOREIGN PATENT DOCUMENTS

CN 1788940 6/2006
CN 101284374 10/2008
(Continued)

OTHER PUBLICATIONS

International Search Report and Written Opinion for International Application No. PCT/US2020/051980, mailed Feb. 4, 2021 (13 pages).

*Primary Examiner* — Thomas M Wittenschlaeger
*Assistant Examiner* — Katie L Gerth
(74) *Attorney, Agent, or Firm* — Neal, Gerber & Eisenberg LLP

(57) ABSTRACT

A fastener driving tool including a housing and a workpiece contact element movably connected to the housing, where the workpiece contact element is movable between a rest position and an activated position. A trigger assembly including a bottom assembly and a top assembly is movably connected to the housing. The tool includes an actuation lever movably connected to the bottom assembly of the trigger assembly and movable between a rest position and an engaged position. The top assembly includes a downwardly extending block configured to engage the actuation lever. A damper mechanism is associated with the actuation lever and is configured to control a rate of movement of the actuation lever.

12 Claims, 6 Drawing Sheets

(56) References Cited

U.S. PATENT DOCUMENTS

| | | | | |
|---|---|---|---|---|
| 3,964,659 | A | 6/1976 | Eiben et al. | |
| 4,351,464 | A | 9/1982 | Fehrs et al. | |
| 4,550,643 | A | 11/1985 | Schwartzenberger | |
| 4,679,719 | A | 7/1987 | Kramer | |
| 5,191,861 | A | 3/1993 | Kellerman | |
| 5,197,646 | A | 3/1993 | Nikolich | |
| 5,522,532 | A | 6/1996 | Chen | |
| 5,551,620 | A | 9/1996 | Vallee | |
| 5,551,621 | A | 9/1996 | Vallee | |
| 5,605,268 | A | 2/1997 | Hayashi et al. | |
| 5,687,897 | A | 11/1997 | Fa et al. | |
| 5,732,870 | A | 3/1998 | Moorman et al. | |
| 5,772,096 | A | 6/1998 | Osuka et al. | |
| 5,862,969 | A | 1/1999 | Lee | |
| 5,909,836 | A | 6/1999 | Shkolnikov et al. | |
| 5,918,788 | A | 7/1999 | Moorman et al. | |
| 6,095,392 | A | 8/2000 | Batts, Jr. | |
| 6,123,241 | A | 9/2000 | Walter | |
| 6,145,724 | A | 11/2000 | Shkolnikov et al. | |
| 6,213,372 | B1 | 4/2001 | Chen | |
| 6,357,647 | B1 | 3/2002 | Ou | |
| 6,371,348 | B1 | 4/2002 | Canlas et al. | |
| 6,382,492 | B1 | 5/2002 | Moorman et al. | |
| 6,431,425 | B1 | 8/2002 | Moorman et al. | |
| 6,450,387 | B1 | 9/2002 | Chen | |
| 6,543,664 | B2 | 4/2003 | Wolfberg | |
| 6,604,664 | B2 | 8/2003 | Robinson | |
| 6,691,907 | B1 | 2/2004 | Chang | |
| 6,695,193 | B1 | 2/2004 | Chang | |
| 6,695,194 | B1 | 2/2004 | Chang | |
| 6,857,547 | B1 | 2/2005 | Lee | |
| 7,070,080 | B2 | 7/2006 | Lin | |
| 7,143,918 | B2 * | 12/2006 | Aguirre | B25C 1/008 227/8 |
| 7,163,134 | B2 | 1/2007 | Moeller et al. | |
| 7,191,927 | B2 | 3/2007 | Segura | |
| 7,196,688 | B2 | 3/2007 | Schena | |
| 7,383,974 | B2 | 6/2008 | Moeller | |
| 7,469,811 | B2 | 12/2008 | Shima et al. | |
| 7,469,818 | B2 | 12/2008 | Saltsor et al. | |
| 7,510,105 | B2 | 3/2009 | Moeller et al. | |
| 7,513,402 | B2 | 4/2009 | Miyahsita et al. | |
| 7,828,072 | B2 | 11/2010 | Hashimoto et al. | |
| 7,938,305 | B2 | 5/2011 | Simonelli et al. | |
| 7,971,766 | B2 * | 7/2011 | Tang | B25C 1/008 227/8 |
| 7,975,890 | B2 * | 7/2011 | Tang | B25C 1/008 227/8 |
| 8,011,441 | B2 | 9/2011 | Leimbach et al. | |
| 8,011,547 | B2 | 9/2011 | Leimbach et al. | |
| 8,251,528 | B2 | 8/2012 | Kim et al. | |
| 8,313,012 | B2 | 11/2012 | Shima et al. | |
| 8,336,749 | B2 | 12/2012 | Largo | |
| 8,348,118 | B2 | 1/2013 | Segura | |
| 8,851,351 | B2 * | 10/2014 | Yeh | B25C 1/047 227/8 |
| 9,061,407 | B2 | 6/2015 | Chien et al. | |
| 9,242,359 | B2 | 1/2016 | Staples | |
| 9,381,663 | B2 | 7/2016 | Maurer | |
| 9,486,907 | B2 | 11/2016 | Birk | |
| 9,550,288 | B2 * | 1/2017 | Moore | B25C 1/008 |
| 9,662,776 | B2 * | 5/2017 | Puppala | B25C 1/008 |
| 9,782,879 | B2 | 10/2017 | Bauer | |
| 9,782,880 | B2 | 10/2017 | Moore et al. | |
| 10,213,911 | B2 | 2/2019 | Moore et al. | |
| 10,532,453 | B2 * | 1/2020 | Puppala | B25C 1/008 |
| 10,543,590 | B2 | 1/2020 | Birk | |
| 10,596,690 | B2 * | 3/2020 | Weigmann | B25C 1/047 |
| 10,688,641 | B2 | 6/2020 | Weigmann | |
| 11,224,959 | B2 * | 1/2022 | Weigmann | B25C 1/04 |
| 2001/0006183 | A1 | 7/2001 | Mukoyama | |
| 2002/0130154 | A1 | 9/2002 | Wolfberg | |
| 2002/0185514 | A1 | 12/2002 | Adams et al. | |
| 2003/0121947 | A1 | 7/2003 | Hsu | |
| 2004/0045997 | A1 | 3/2004 | Birk | |
| 2005/0023318 | A1 * | 2/2005 | Aguirre | B25C 1/008 227/8 |
| 2005/0029323 | A1 | 2/2005 | Shima | |
| 2005/0139628 | A1 * | 6/2005 | Aguirre | B25C 1/008 227/8 |
| 2005/0173484 | A1 | 8/2005 | Moeller | |
| 2005/0173487 | A1 | 8/2005 | Moeller et al. | |
| 2005/0217874 | A1 | 10/2005 | Forster | |
| 2005/0217875 | A1 | 10/2005 | Forster | |
| 2005/0220445 | A1 | 10/2005 | Baskar | |
| 2007/0004984 | A1 | 1/2007 | Crum | |
| 2007/0131731 | A1 | 6/2007 | Moeller | |
| 2007/0278275 | A1 | 12/2007 | Ho | |
| 2008/0073405 | A1 | 3/2008 | Shima | |
| 2008/0251558 | A1 | 10/2008 | Suda | |
| 2009/0057365 | A1 | 3/2009 | Murayama | |
| 2009/0108046 | A1 | 4/2009 | Huang | |
| 2009/0159633 | A1 * | 6/2009 | Wu | B25C 1/008 227/8 |
| 2009/0236387 | A1 | 9/2009 | Simonelli | |
| 2009/0242604 | A1 | 10/2009 | Mina | |
| 2009/0250500 | A1 | 10/2009 | Brendel | |
| 2009/0314818 | A1 | 12/2009 | Segura | |
| 2010/0012700 | A1 * | 1/2010 | Perron | B25C 1/043 227/8 |
| 2010/0116863 | A1 | 5/2010 | Suda | |
| 2010/0173686 | A1 | 7/2010 | Grant | |
| 2010/0236911 | A1 | 9/2010 | Wild | |
| 2010/0237124 | A1 | 9/2010 | Shima | |
| 2010/0243699 | A1 | 9/2010 | Largo | |
| 2010/0276467 | A1 * | 11/2010 | Kramer | B25C 1/008 227/8 |
| 2011/0248061 | A1 * | 10/2011 | Liu | B25F 5/00 227/8 |
| 2012/0022525 | A1 | 1/2012 | Dietz | |
| 2012/0041436 | A1 | 2/2012 | Ullrich | |
| 2012/0097730 | A1 | 4/2012 | Liang et al. | |
| 2012/0104070 | A1 | 5/2012 | Wu et al. | |
| 2012/0118932 | A1 | 5/2012 | Largo | |
| 2012/0138658 | A1 | 6/2012 | Ullrich | |
| 2012/0298390 | A1 | 11/2012 | Schieler | |
| 2013/0041368 | A1 | 2/2013 | Cunnignham | |
| 2013/0062390 | A1 * | 3/2013 | Yeh | B25C 1/047 227/8 |
| 2015/0165611 | A1 | 6/2015 | Puppala | |
| 2016/0114470 | A1 * | 4/2016 | Weigmann | B25C 1/047 227/8 |
| 2017/0050305 | A1 | 2/2017 | Birk | |
| 2018/0117747 | A1 | 5/2018 | Hahndel | |
| 2019/0099871 | A1 | 4/2019 | Fukushima | |
| 2019/0134795 | A1 | 5/2019 | Bauer | |
| 2019/0176312 | A1 | 6/2019 | Theberath et al. | |
| 2019/0184536 | A1 | 6/2019 | Moore et al. | |
| 2019/0291253 | A1 * | 9/2019 | Knight | B25C 1/047 |
| 2019/0358798 | A1 | 11/2019 | Bauer | |
| 2020/0171638 | A1 * | 6/2020 | Meredith | B25C 1/008 |
| 2020/0238492 | A1 | 7/2020 | Bauer | |
| 2020/0306940 | A1 | 10/2020 | Theberath et al. | |

FOREIGN PATENT DOCUMENTS

| | | |
|---|---|---|
| CN | 101743099 | 6/2010 |
| DE | 20 2013 001 537 | 3/2013 |
| DE | 10 2013 106 657 | 1/2015 |
| EP | 0 736 360 | 10/1996 |
| EP | 1 223 009 | 7/2002 |
| EP | 1 240 982 | 9/2002 |
| EP | 1 980 367 | 10/2008 |
| EP | 2 450 152 | 5/2012 |
| EP | 2 767 365 | 8/2014 |
| EP | 2 832 502 | 2/2015 |
| JP | H08276375 | 10/1996 |
| JP | 2002346946 | 12/2002 |
| WO | WO 02/051591 | 7/2002 |
| WO | WO 2019/038124 | 2/2019 |

* cited by examiner

FASTENER DRIVING TOOL

PRIORITY CLAIM

This patent application is a continuation of and claims priority to and the benefit of U.S. patent application Ser. No. 17/961,283, filed Oct. 6, 2022, which is a continuation of and claims priority to and the benefit of U.S. patent application Ser. No. 17/027,026, filed Sep. 21, 2020, now issued as U.S. Pat. No. 11,491,623 on Nov. 8, 2022, which claims priority to and the benefit of U.S. Provisional Patent Application No. 62/909,302, filed Oct. 2, 2019, the entire contents of each of which are incorporated herein by reference.

BACKGROUND

The present disclosure relates generally to powered, fastener-driving tools, wherein the tools may be electrically powered, pneumatically powered, combustion powered, or powder activated.

Various known powered fastener driving tools of the type used to drive various fasteners, such as, for example, staples, nails, and the like, often include a housing, a power source, a supply of fasteners, a trigger mechanism for initiating the actuation of the tool, and a workpiece contact element (also referred to herein as a "WCE"). The workpiece contact element is configured to contact a workpiece, and is operatively connected to the trigger mechanism, such that when the workpiece contact element contacts with the workpiece, and is depressed or moved inwardly a predetermined amount with respect to the housing, the trigger mechanism is enabled so as to initiate actuation of the fastener-driving tool.

Various known powered fastener driving tools have two different types of operational modes and one or more mechanisms that enable the operator to optionally select one of the two different operational modes that the operator desires to use for driving the fasteners.

One such operational mode is known in the industry as the sequential or single actuation operational mode. In this operational mode, the actuation of the trigger mechanism will not (by itself) initiate the actuation of the powered fastener driving tool (and the driving of a fastener into the workpiece) unless the WCE is sufficiently depressed against the workpiece. In other words, to operate the powered fastener driving tool in accordance with the sequential or single actuation operational mode, the WCE must first be depressed against the workpiece followed by the actuation of the trigger mechanism.

Another such operational mode is known in the industry as the contact actuation operational mode. In this operational mode, the operator can maintain the trigger mechanism at or in its actuated position, and subsequently, each time the WCE is in contact with, and sufficiently pressed against the workpiece, the power fastener driving tool will actuate (thereby driving a fastener into the workpiece).

Various known powered fastener driving tools are combustion-powered. Many combustion-powered fastener driving tools are powered by a rechargeable battery (or battery pack) and a replaceable fuel cell or cartridge. Various combustion-powered fastener driving tools, battery packs, and fuel cells have been available commercially from ITW-Paslode of Vernon Hills, Illinois (a division of Illinois Tool Works Inc., the assignee of this patent application).

In these combustion-powered fastener driving tools, the fuel cell or cartridge supplies fuel, and the battery provides energy to ignite the fuel. The battery powered ignition of the fuel generates a high pressure gas that moves the piston and attached driving blade to strike a fastener (such as a nail from the nail magazine).

Such known combustion-powered fastener driving tools are often more powerful than electrically powered or pneumatically powered fastener driving tools. Combustion-powered fastener driving tools are thus typically used for higher power required applications such as attaching a metal object to a concrete substrate wherein the fastener has to be driven through the metal object and into the concrete substrate. This is opposed to a lower powered fastener driving tool such as certain pneumatically powered tools that are used to attach one wooden object to another wooden object.

There is a continuing need to make fastener driving tools more efficient and of lighter weight. There is also a continuing need to provide such fastener driving tools that are readily, quickly and easily manipulated to be alternately operable between a sequential actuation mode and a contact actuation mode.

SUMMARY

Various embodiments of present disclosure provide a new and improved fastener driving tool that includes a trigger assembly that enables the contact actuation mode of the tool until the tool is inactive for a predetermined period of time, after which the trigger must be reset. Various embodiments of the present disclosure provide a new and improved fastener driving tool including a trigger assembly that enables switching between actuation modes without the need to manually adjust the tool.

In various embodiments, the present disclosure provides a trigger assembly for a the fastener driving tool. The trigger assembly includes: (1) a bottom assembly including a pivotable trigger rotatably attached to a housing of the fastener driving tool; (2) an actuation lever attached to the pivotable trigger; (3) an actuation lever spring attached to the actuation lever and configured to bias the actuation lever to a first position; (4) a ramp attached to the pivotable trigger; and (5) a damper mechanism attached to the actuation lever to control a rate of movement of the actuation lever. The trigger assembly also includes: (6) a top assembly including a top housing attached to the housing of the fastener driving tool; and (7) a downwardly extending block engageable with the actuation lever and the ramp to move the actuation lever to a second position different from the first position.

In various other embodiments, the present disclosure provides a fastener driving tool including a fastener driving tool housing, a workpiece contact element, and a trigger assembly. The trigger assembly includes: (1) a bottom assembly including a pivotable trigger rotatably attached to the fastener driving tool housing; (2) an actuation lever attached to the pivotable trigger; (3) an actuation lever spring attached to the actuation lever and configured to bias the actuation lever to a first position; (4) a ramp attached to the pivotable trigger; and (5) a damper mechanism attached to the actuation lever to control a rate of movement of the actuation lever. The trigger assembly also includes: (6) a top assembly including a top housing attached to the fastener driving tool housing; and (7) a downwardly extending block engageable with the actuation lever and the ramp to move the actuation lever to a second position different from the first position.

Other objects, features, and advantages of the present disclosure will be apparent from the following detailed disclosure and accompanying drawings.

DETAILED DESCRIPTION

Figure 1:
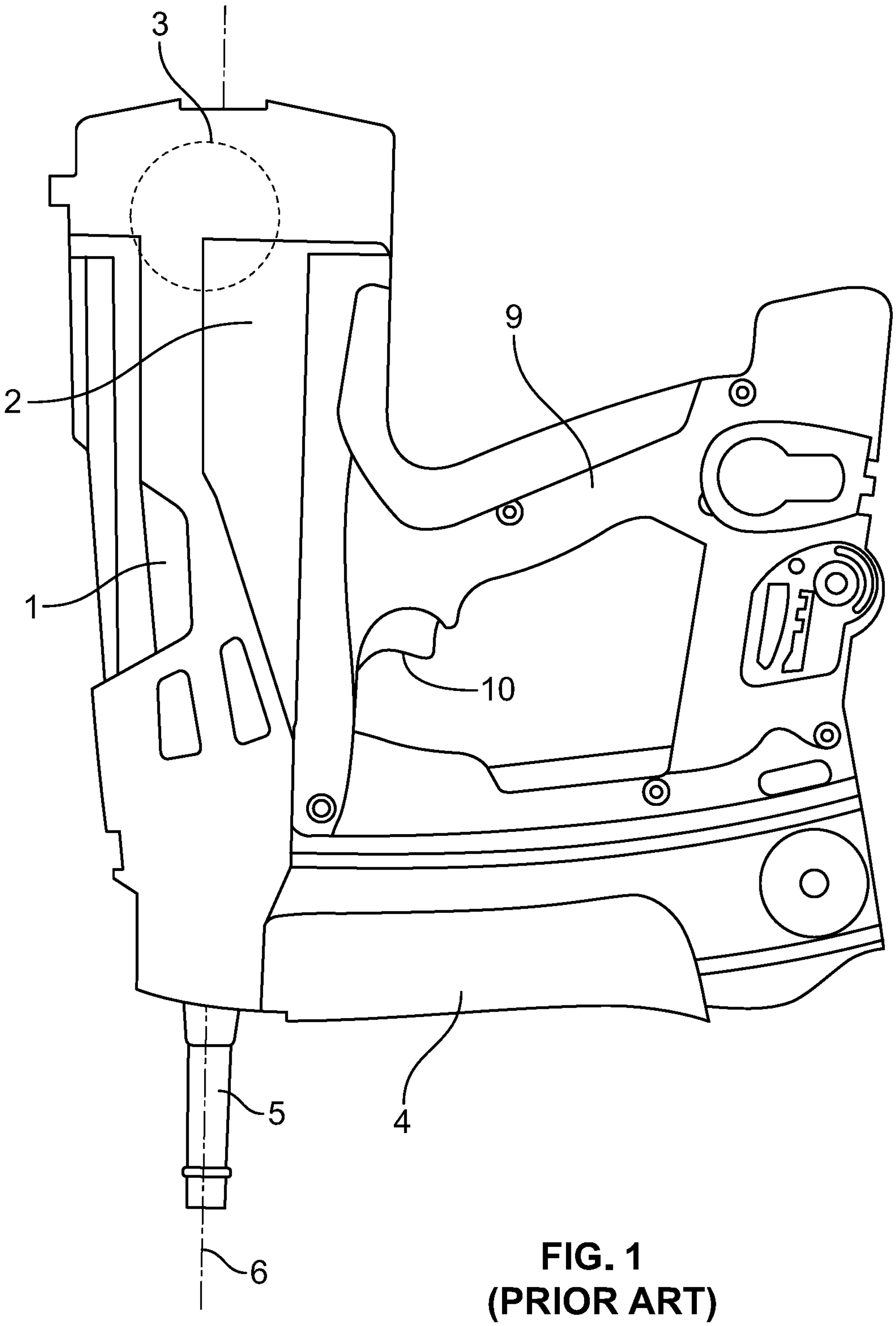
FIG. 1 (PRIOR ART)
FIG. 1 is a side view of an example known combustion powered fastener driving tool.

While the systems, devices, and methods described herein may be embodied in various forms, the drawings show and the specification describes certain exemplary and non-limiting embodiments. Not all of the components shown in the drawings and described in the specification may be required, and certain implementations may include additional, different, or fewer components. Variations in the arrangement and type of the components; the shapes, sizes, and materials of the components; and the manners of connection of the components may be made without departing from the spirit or scope of the claims. Unless otherwise indicated, any directions referred to in the specification reflect the orientations of the components shown in the corresponding drawings and do not limit the scope of the present disclosure. Further, terms that refer to mounting methods, such as coupled, mounted, connected, etc., are not intended to be limited to direct mounting methods, but should be interpreted broadly to include indirect and operably coupled, mounted, connected, and like mounting methods. This specification is intended to be taken as a whole and interpreted in accordance with the principles of the present disclosure and as understood by one of ordinary skill in the art.

This disclosure relates to a trigger assembly for a fastener driving tool, and to a fastener driving tool having a trigger assembly. In various embodiments, the movement of depressing or holding down the trigger enables the trigger assembly to reach a contact or continuous actuation mode, wherein the fastener driving tool is configured to drive a fastener each time a workpiece contact element of the fastener driving tool is activated. While the trigger is depressed, the fastener driving tool remains in the continuous actuation mode for a predetermined time period. Each time the fastener driving tool is activated to drive a fastener (e.g., by activating the workpiece contact element), the predetermined time period is reset. After this predetermined time period elapses without a fastener being driven, the fastener driving tool exits the continuous actuation mode (by entering either a sequential actuation mode or a non-operational mode). At this stage, the operator must release the trigger to reset the trigger assembly of the fastener driving tool before another fastener can be driven by the fastener driving tool.

An example fastener driving tool that is operable to carry out the functions described above is disclosed in further detail herein. Specifically, this example includes to a trigger assembly for a fastener driving tool, that enables an operator to switch from a sequential actuation mode to a contact actuation mode without requiring additional manually operated switches or levers. The trigger assembly enables an operator to engage a pivotable trigger of the bottom assembly, and operate the tool by pressing the workpiece contact element into a workpiece. After the fastener has been driven, a spring and a damper mechanism in part control the motion of the actuation lever of the trigger, controlling a duration of time required to move the actuation lever from an activated position to a deactivated or rest position. This enables the operator to operate the tool in a sequential actuation mode by first pulling the trigger, and then contacting the workpiece with the workpiece contact element. The spring and the damper mechanism (along with various other components) then control the actuation lever such that the tool then operates in the contact actuation mode until a sufficient time has elapsed for the actuation lever to return to the rest position. After that time has elapsed, the operator must release the trigger and reengage the trigger to drive another fastener. In other words, the operator can continue to operate the tool in the contact actuation mode until the actuation lever returns to the rest position, which does not occur so long as the operator continues to drive fasteners in rapid succession. When a sufficient delay between fastener driving events occurs, the actuation lever returns to the rest position, and the trigger assembly must be reset to drive additional fasteners. This prevents the operator from accidentally driving a fastener after a relatively long delay because the operator forgot to switch the operational mode. The trigger assembly of the present disclosure automatically requires the operator to reset the trigger assembly by releasing and reengaging after a sufficient delay between fastener driving events.

FIG. 1 shows an example known combustion powered fastener driving tool including a housing 1 in which is located an internal combustion engine 2 with a combustion chamber 3 configured to contain a mixture of air and combustible gas, whose firing causes the propulsion of a piston configured to drive a fastener (such as a nail or a staple) from a feeding magazine 4. The fastener (not shown) is configured move through and exit (not labeled) from a guide tip 5 extending from the housing 1 and along an axis 6. The tool includes a handle 9 and a trigger 10 for actuating the tool.

The trigger assembly 102 of the present disclosure can be used in connection with such known combustion powered fastener driving tools of FIG. 1, or with other known or new combustion powered fastener driving tools. It should be appreciated that the trigger assembly 102 of the present disclosure can also be used in connection with any other suitable fastener driving tool, such as tools that are electrically powered, pneumatically powered, combustion powered, powder activated, or powered via some other mechanism.

Figure 2:
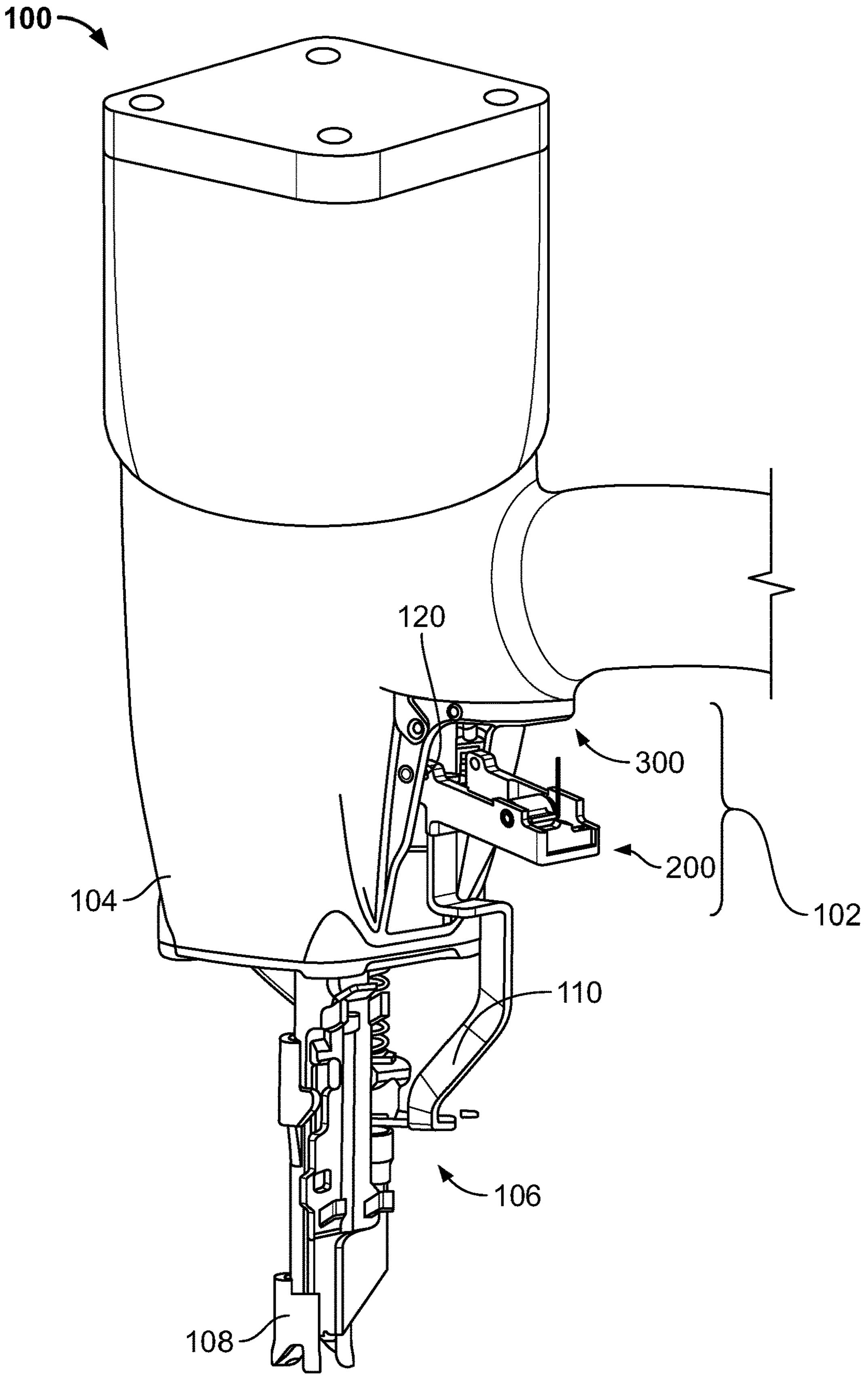
FIG. 2 is an enlarged fragmentary perspective view of a fastener driving tool of one example embodiment of the present disclosure.

Referring now to FIG. 2, part of an example fastener driving tool of the present disclosure is shown. The example fastener driving tool 100 includes: (1) a housing 104; (2) a workpiece contact element assembly 106; and (3) a trigger assembly 102.

The housing 104 is a structure configured to house various components described herein, and to provide protection to the components from dust, dirt, and other materials present in the working environment. The various components described herein may be attached to the housing 104 at various locations. As such, it should be understood that the housing 104 may take various forms or shapes, and may be made from any suitable materials including plastic, metal, composite materials, and more.

The example workpiece contact assembly 106 includes: (1) a lower workpiece contact element 108; and (2) an upper workpiece contact element linkage member 110. The lower workpiece contact element 108 is configured to move relative to the housing on contact with a workpiece. The upper workpiece contact element linkage member 110 is slidably mounted in a reciprocal manner to the housing 104. The workpiece contact element linkage member 110 is connected to the lower workpiece contact element 108, and is movable to contact the actuation lever 230, as shown in greater detail in FIGS. 3, 5A, 5B, 5C, and 5D.

Figure 3:
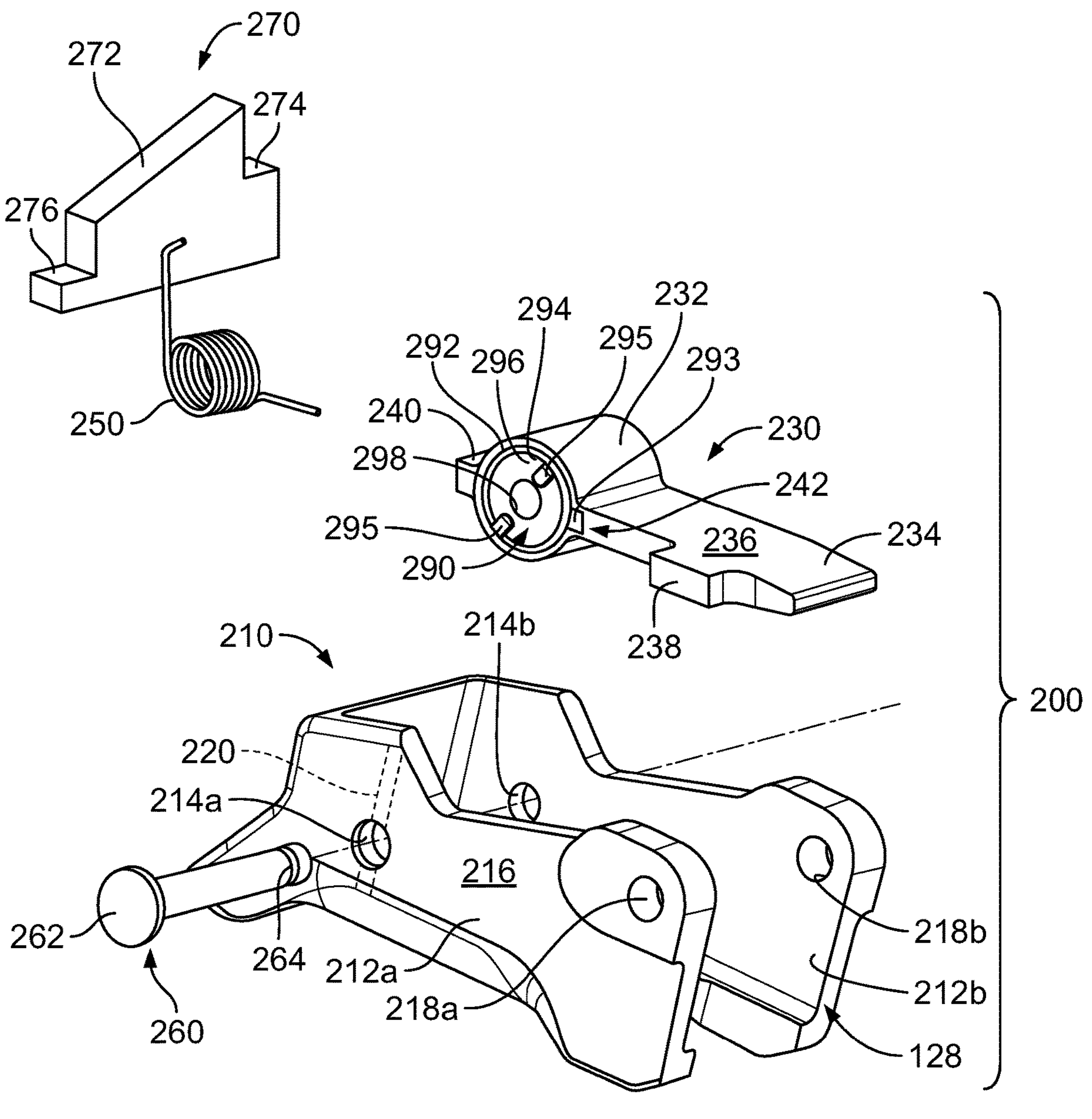
FIG. 3 is an enlarged exploded perspective view of a bottom assembly of a trigger assembly of the fastener driving tool of FIG. 2.
Figure 4:
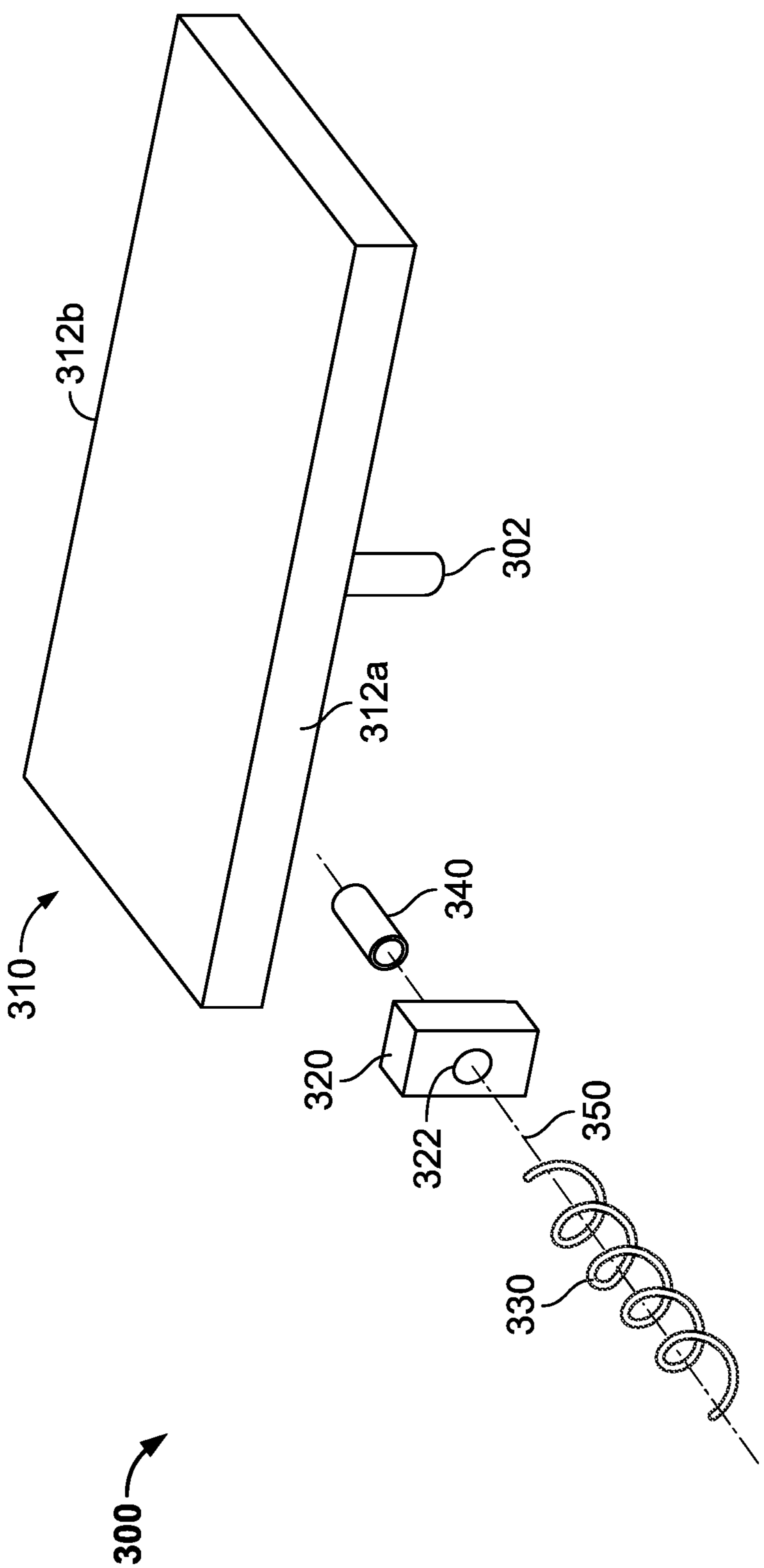
FIG. 4 is an enlarged exploded view of a top assembly of the trigger assembly of the fastener driving tool of FIG. 2.

Referring now to FIGS. 2, 3, and 4, the example trigger assembly 102 generally includes: (1) a bottom assembly 200; and (2) a top assembly 300. The example bottom assembly 200 generally includes: (i) a pivotable trigger 210, (ii) an actuation lever 230, (iii) an actuation lever spring 250, (iv) an actuation lever pin 260, (v) a ramp 270, and (vi) a damper mechanism 290. The example top assembly 300 generally includes: (i) a valve stem 302, (ii) a top housing 310, (iii) a downwardly extending block 320, (iv) a block spring 330, (v) a spacer 340, and (vi) a rod 350 (shown as a line in FIG. 4 and better shown as a rod in FIGS. 6A, 6B, 6C, and 6D).

Referring now more specifically to the bottom assembly 200, the pivotable trigger 210 includes oppositely disposed side walls 212*a* and 212*b* to accommodate the actuation lever 230 between the side walls 212*a* and 212*b*. The first side wall 212*a* includes a corresponding first outer surface 216. The second side wall 212*b* includes a corresponding second outer surface (not shown). The side walls 212*a* and 212*b* define first through-holes 214*a* and 214*b* configured to receive actuation lever pin 260. The side walls 212*a* and 212*b* define second through-holes 218*a* and 218*b* configured to receive trigger assembly pin 120 for pivotally mounting the bottom assembly 200 to the housing 104 of the tool 100 (as best seen in FIG. 2).

The actuation lever 230 includes: (1) a cylindrical portion 232, (2) an elongated lever portion 234, and (3) a rear tab portion 240.

The cylindrical portion 232 defines an inner generally cylindrical chamber configured to receive damper mechanism 290 for, in part, controlling a rate of movement (e.g., rotation) of the actuation lever 230 with respect to the pivotable trigger 210. The damper assembly 290 is described in further detail below. The cylindrical portion 232 is rotatably mounted in the pivotable trigger 200.

The elongated lever portion 234 extends from the cylindrical portion 232. The elongated lever portion 234 includes a top surface 236 configured to engage the valve stem 302 of the top assembly 300. When the actuation lever 230 engages the valve stem 302, it enables a fastener to be driven into the workpiece. The elongated lever portion 234 includes a bottom surface (not labeled) configured to engage or be engaged by the upper workpiece contact element linkage member 110. The elongated lever portion 234 includes a protruding spring engagement tab 238 configured to engage a first end of the actuation lever spring 250. The spring engagement tab 238 extends laterally from the elongated lever portion 234, such that an "L" shape is formed by the elongated lever portion 234 and the spring engagement tab 238. This is best illustrated in FIG. 3

The rear tab portion 240 extends from the cylindrical portion 232 opposite the elongated lever portion 234. The rear tab portion 240 and the elongated lever portion 234 are aligned such that they extend from the cylindrical portion 232 along an axis that extends through the center of the cylindrical portion 232. The rear tab portion 240 is offset from a central longitudinal axis of the actuation lever 230 when viewed from above. This is best illustrated in FIGS. 6A, 6B, 6C, and 6D. The rear tab portion 240 extends from the cylindrical portion 232 and stops short of the ramp 270. The rear tab portion 240 is configured to engage with the downwardly extending block 320 of the top assembly 300. This is best illustrated in FIGS. 5A, 5B, 5C, and 5D.

The actuation lever spring 250 is positioned in line with (e.g., next to or adjacent to) actuation lever 230. The actuation lever spring 250 is connected at a first end (not labeled) to the pivotable trigger 210, and at a second end (not labeled) to the protruding spring engagement tab 238. The actuation lever spring 250 biases the actuation lever 230 toward a first position or rest position (e.g., causing the actuation lever 230 to rotate such that the elongated lever portion 234 is rotated downward away from the valve stem 302 of the top assembly 300). The actuation lever spring 250 may be a torsion spring as shown in the FIGS. However, it should be appreciated that the actuation lever spring 250 may be a coil spring, a leaf spring, or any other suitable spring, and may be located on the actuation lever pin 260, the actuation lever 230, or any other component of the trigger assembly 102 and/or housing 104 to bias the actuation lever 230 toward a first position or rest position.

The actuation lever pin 260 is inserted and extends through through-hole 214*a*, the actuation lever spring 250, the actuation lever 230 and damper mechanism 290, and then through through-hole 214*b*. The actuation lever pin 260 enables rotation of the actuation lever 230 with respect to the pivotable trigger 210. As shown in FIG. 3, the actuation lever pin 260 includes a first end having a head 262 and a second end (opposite the first end) that defines a groove 264. The pin 260 is inserted through the through-hole 214*a*, actuation lever spring 250, actuation lever 230 and damper mechanism 290, and through-hole 214*b* until the head 262 contacts the outer surface 216 of the first side wall 212*a*.

The ramp 270 includes: (1) an angled top surface 272, (2) an upper flat top wall 274, and (3) a lower flat top wall 276. The ramp 270 is fixedly attached to the pivotable trigger 210 on the side proximate the rear tab portion 240. The ramp 270 is oriented transverse to the rotation of the actuation lever 230, and substantially parallel to the actuation lever pin 260. The angled top surface 272 extends downward, forming an angled surface to engage the downwardly extending block 320. FIG. 3 illustrates the angled top surface 272 descending to the left (i.e., toward the side wall 212*a* that is proximate actuation lever spring 250). It should be appreciated that the angled top surface 272 may be flipped, rotated, or oriented in another direction than shown. The top angled surface 272 is engageable with the downwardly extending block 320 when the bottom assembly 200 is rotated up toward the top assembly 300. This is best illustrated in FIGS. 6A, 6B, 6C, and 6D.

The damper mechanism 290 includes an outer member 292 and an inner member 294. An example of the damper mechanism 290 is shown in FIG. 3. The outer member 292 is made of plastic and includes a closed end having a central through-hole (not shown), an opposing, open end and an elongated protruding tab 293 that extends from an outer surface of the outer member 292 and is configured to engage the surface that defines a groove 242 defined by the actuation lever cylindrical portion 232. The mating engagement of the tab 293 and the surface that defines the groove 242 helps to secure the outer member 292 in position relative to the actuation lever 230 such that the outer member 292 moves or rotates in unison with the actuation lever 230. Similarly, the inner member 294 is made of plastic and has a generally cylindrical shape. At least one and preferably a pair of protruding prongs 295 extend from an end cap 296 of the inner member 294 and are configured to engage the surface that defines a slot-like groove 220 and particularly defined by the inner surface of the side wall 212*a* of the pivotable trigger 210. The mating engagement of the protruding prongs 295 and the surface that defines the slot-like groove 220 helps to secure the inner member 294 in position such that the outer member 292 and actuation lever 230 rotate relative to the inner member 294 and pivotable trigger 210. As shown in FIG. 3, the end cap 296 covers an end of the inner member 294 and forms a seal with the outer member 292.

To control the rate of movement or rotation of the inner member 294 relative to the outer member 292, the damper mechanism 290 is configured so that the outer diameter of the inner member 294 is less than the inner diameter of the outer member 292 to form an annular space between the inner and outer members. A damping fluid, such as a silicone fluid, is injected or inserted into the annular space between the inner and outer members to assist in controlling the rate of movement of the outer member relative to the inner member based on the viscosity of the fluid. For example, damping fluids having a high viscosity inhibit the movement of the outer member 292 relative to the inner member 294 more than fluids having a low viscosity. It should also be appreciated that the rate of movement or rotation of the actuation lever 230 may also be partially controlled by the type of actuation lever spring 250 that is associated with the actuation lever 230, and the spring rate, size, or other characteristic of the spring. As stated above, there is a seal (not shown) formed between the end cap 296 of the inner member 294 and the outer member 292 such that the seal helps to prevent the damping fluid from leaking out of the annular space.

As shown in FIG. 3, the inner member 294 defines a through-hole 298 configured to receive the actuation lever pin 260 such that the first through-holes 214*a* and 214*b* defined by the side walls 212*a* and 212*b* of the pivotable trigger 210 are aligned with the through-hole 298 of the inner member 294 and the central through-hole in the actuation lever 230. This enables the actuation lever pin 260 to be inserted through the aligned through-holes 214*a*, 214*b*, and 298 to secure the actuation lever 230 to the pivotable trigger 210. The protrusions or prongs 295 on the inner member 294 are inserted in the slot-like groove 220 defined by the inner surface of the pivotable trigger side wall 212*a* to secure the inner member 294 in position on the pivotable trigger 210.

As described above, the damper mechanism 290 in part controls the rate of movement or rate of rotation of the outer member 292, and thereby the actuation lever 230, relative to the pivotable trigger 210. Since the actuation lever 230 is in the contact actuation mode while it is moving between the valve stem 302 and the rest position (toward which the actuation lever is biased by the spring 250), the time that the tool 100 is in the actuation mode is determined by the rate of movement or rotation of the actuation lever 230 and thereby by the damper mechanism 290 and the actuation lever spring 250. It should be appreciated that the rate of movement of the actuation lever 230 may be, in part, controlled by the type or size of the damper mechanism 290 associated with the actuation lever 230 or the type or size of the actuation lever spring 250 that biases the actuation lever to the rest position. It should also be appreciated that the damper mechanism 290 is one example of a damper mechanism or damper that may be used in the fastener driving tool 100 of the present disclosure and it is contemplated that other suitable damping mechanisms may be used including but not limited to fluid dampers, pneumatic dampers, friction dampers or any suitable damper mechanisms.

The top assembly 300 of the trigger assembly 102 is shown in greater detail in FIG. 4. As mentioned above, the top assembly 300 includes: (1) the valve stem 302, (2) a top housing 310, (3) a downwardly extending block 320, (4) a block spring 330, (5) a spacer 340, and (6) a rod 350.

The valve stem 302 engages with the top surface 236 of the actuation lever 230 to enable a fastener to be driven into the workpiece. The valve stem 302 is positioned near a middle of the top housing 310 above the elongated portion 234 of the actuation lever 230 as shown in FIGS. 4, 5A, 5B, 5C, and 5D.

The top housing 310 includes oppositely disposed side walls 312*a* and 312*b* configured to accommodate the downwardly extending block 320, block spring 330, spacer 340, and rod 350 between the side walls 312*a* and 312*b*.

The downwardly extending block 320, block spring 330, spacer 340, and rod 350 are aligned such that the rod 350 extends through the spring 330, downwardly extending block 320, and spacer 340. The downwardly extending block 320 is generally rectangular in shape. It should be appreciated that other shapes may be used as well. The downwardly extending block 320 defines a through hole 322 through which the rod 350 extends, to enable the downwardly extending block 320 to slide laterally along the rod 350. This is illustrated best in FIGS. 5A, 5B, 5C, and 5D. The downwardly extending block 320 is positioned between the block spring 330 and the spacer 340. The block spring 330 biases the downwardly extending block 320 toward the spacer 340 and a first position or rest position. The downwardly extending block 320 is configured to engage the rear tab portion 240 of the actuation lever 230, as well as the ramp 270. This is shown in further detail in FIGS. 5A, 5B, 5C, 5D, 6A, 6B, 6C, and 6D.

Having described the various structural components comprising the new and improved trigger assembly 102, a brief description of the operation of the trigger assembly in operation is now be provided with reference to FIGS. 5A, 5B, 5C, 5D, 6A, 6B, 6C, and 6D.

Figure 5A:
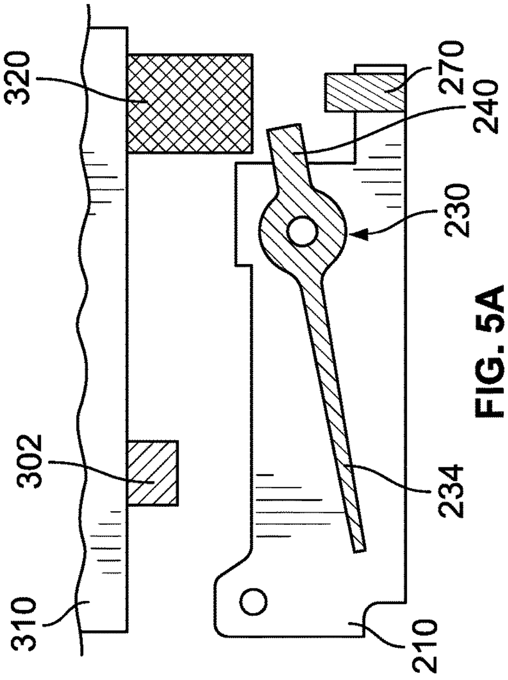
FIGS. 5A, 5B, 5C, and 5D are side partial cross-sectional views of the top and bottom assemblies of the trigger assembly of the fastener driving tool of FIG. 2, showing the position of various components during a trigger actuation sequence.
Figure 5B:
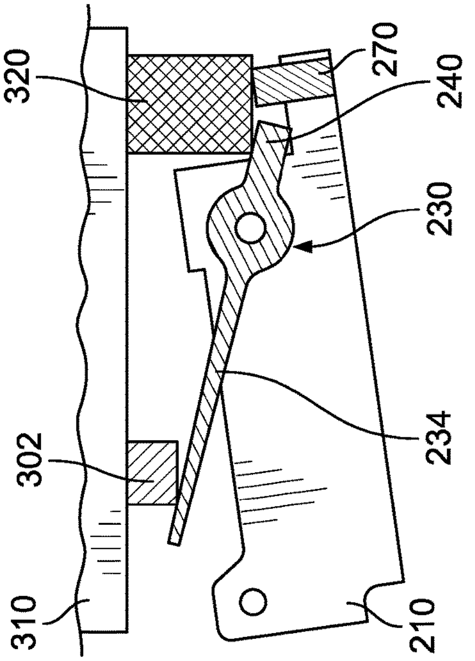
Figure 5C:
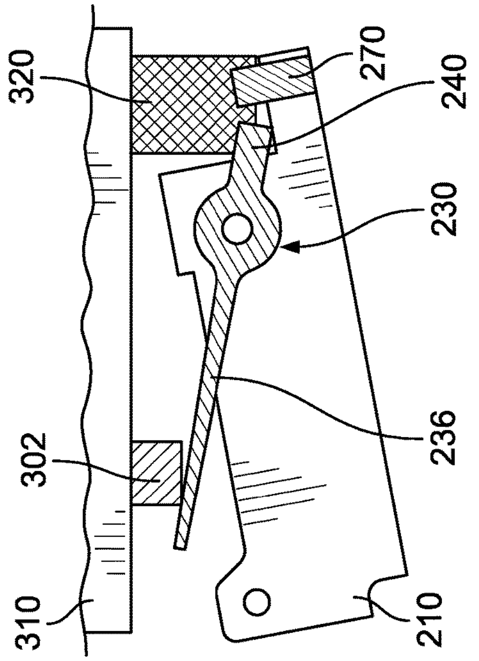
Figure 5D:
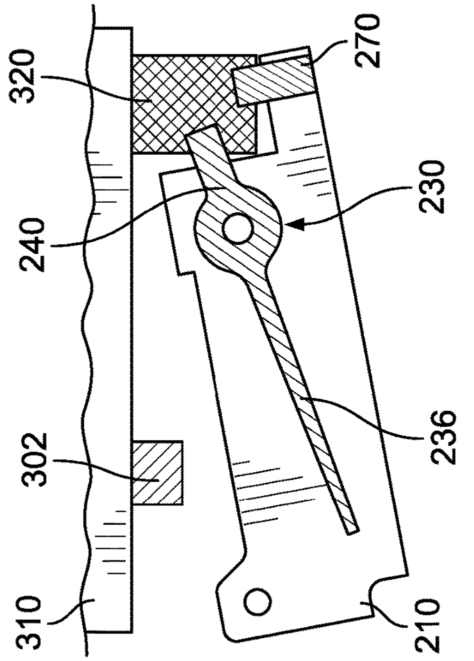
Figure 6A:
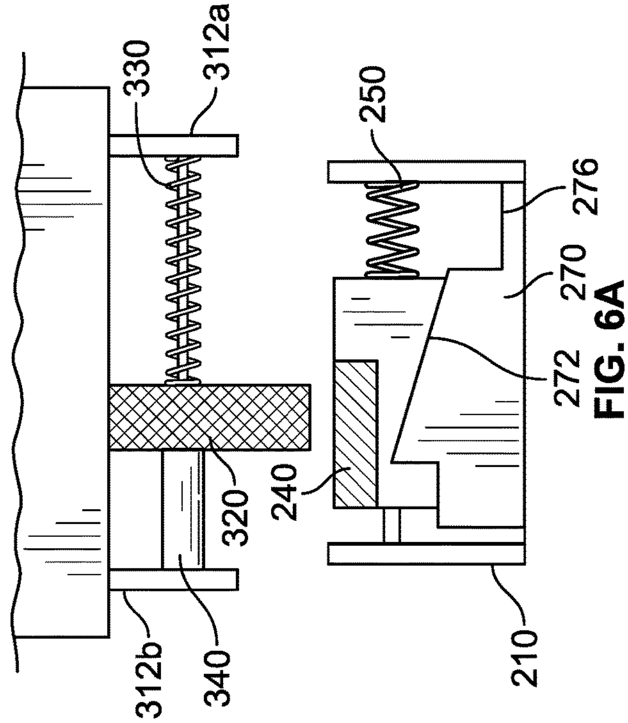
FIGS. 6A, 6B, 6C, and 6D are rear partial cross-sectional views of the top and bottom assemblies of the trigger assembly of the fastener driving tool of FIG. 2, showing the position of various components during the trigger actuation sequence.
Figure 6B:
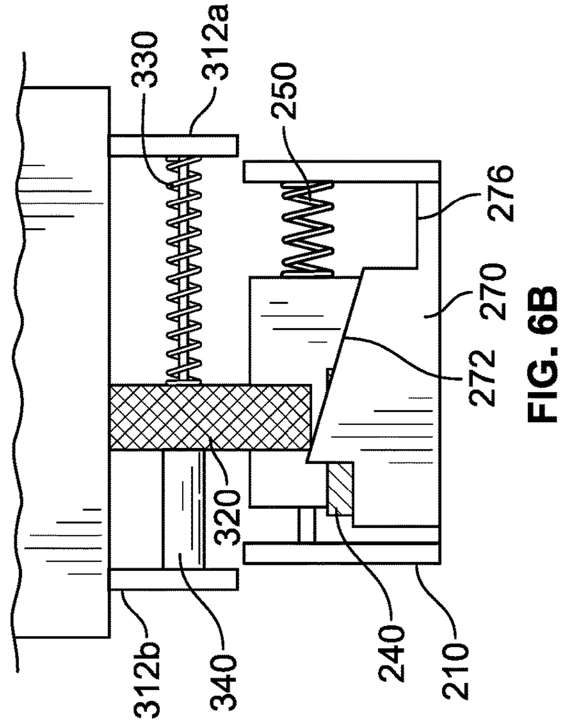
Figure 6C:
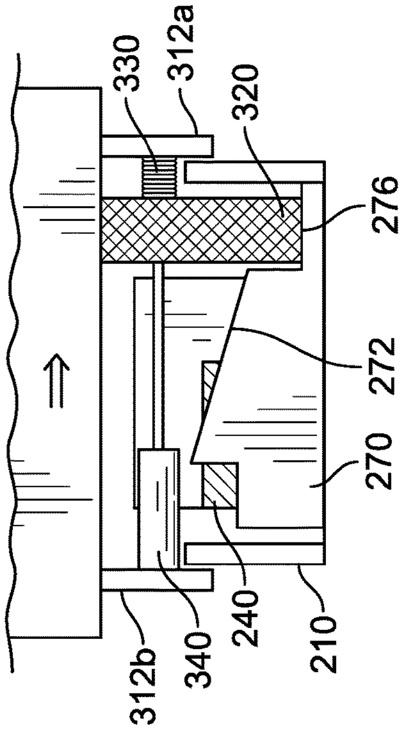
Figure 6D:
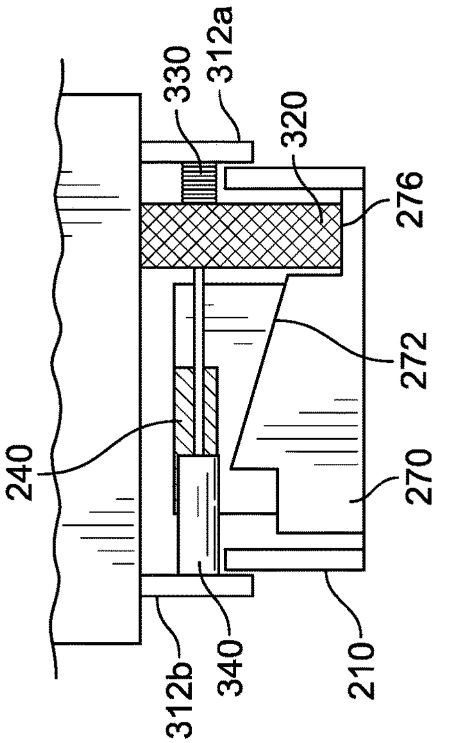

FIGS. 5A, 5B, 5C, and 5D, and 6A, 6B, 6C, and 6D respectively illustrate the same series of movements, with 5A, 5B, 5C, and 5D providing side views and 6A, 6B, 6C, and 6D providing rear views. FIGS. 5A and 6A illustrate a rest position. FIGS. 5B and 6B illustrate an initial engagement position. FIGS. 5C and 6C illustrate a continued engagement position. FIGS. 5D and 6D illustrate an end position.

The rest position shown in FIGS. 5A and 6A may also be referred to as a reset position or first position. The components are in this position before an operator has engaged the trigger assembly 102, and/or after the operator has let go of the trigger assembly 102 and a sufficient time has passed such that the components "reset." In the rest position, the actuation lever spring 250 biases the elongated portion 234 of the actuation lever 230 away from the valve stem 302.

The downwardly extending block 320 is not in contact with the rear tab portion 240 of the actuation lever 230. The downwardly extending block 320 is also not in contact with the angled top surface 272 of the ramp 270. The downwardly extending block 320 is biased to a first position above the rear tab portion 240 and a high side of the angled top surface 272.

The initial engagement position is shown in FIGS. 5B and 6B. In this position, the operator or some other force has rotated the pivotable trigger 210 upward toward the top housing 310 (e.g., the operator has begun to upwardly pull the pivotable trigger 210). The actuation lever spring 250 continues to bias the elongated portion 234 of the actuation lever 230 away from the valve stem 302. However, this force is overcome by the force on the rear tab portion 240 by the downwardly extending block 320. The downwardly extending block 320 contacts the rear tab portion 240, causing the actuation lever 230 to rotate clockwise as shown in FIG. 5B. The block spring 330 continues to bias the downwardly extending block 320 toward the first position (e.g., left in FIG. 5B). This force is matched by the spacer 340 such that the downwardly extending block 320 remains in place without moving laterally.

The continued engagement position is shown in FIGS. 5C and 6C. In this position, the operator or some other force has continued to rotate the pivotable trigger 210 upward toward the top housing 310. The actuation lever spring 250 continues to bias the elongated portion 234 of the actuation lever 230 away from the valve stem 302. However, this force is further overcome by the force of the downwardly extending block 320 acting on the rear tab portion 240. This force causes the actuation lever 230 to rotate and contact the valve stem 302. The downwardly extending block 320 also contacts the angled top surface 272 of the ramp 270. The downward force on the angled top surface 272 causes a resulting lateral force to act on the downwardly extending block 320. The resulting lateral force on the downwardly extending block 320 overcomes the force of the block spring 330, causing the downwardly extending block 320 to slide laterally (e.g., to the right in FIG. 6C) and compress the block spring 330. The downwardly extending block 320 reaches the low end of the angled top surface 272 of the ramp 270. When the lateral force is greater than a threshold force, the downwardly extending block 320 slides far enough such that it slips off the angled top surface 272 onto the lower flat top surface 276. The ramp geometry (e.g., the upright inner wall connected to the low end of the angled top surface 272) prevents the downwardly extending block 320 from sliding back to the rest position while the trigger is depressed. The damper 290 (along with other components) controls the rotation of the actuation lever, preventing it from immediately rotating back to the rest position. As such, the damper 290 enables the actuation lever 230 to remain in contact with the valve stem 302 for a predetermined duration of time after the downwardly extending block has moved out of contact with the rear tab portion 240 of the actuation lever 230. The operator can actuate the tool 100 each time that the workpiece contact element 108 is pressed against the workpiece until the actuation lever 230 is in one of the positions shown in FIGS. 5A, 5D, 6A, and 6D. Thus, while the tool 100 is in the position shown in FIGS. 5C and 6C, the operator can continue to operate the tool 100 in a contact actuation mode. However, as described below, after a sufficient time has elapsed between firings, the tool 100 will proceed to the end position shown in FIGS. 5D and 6D.

The end position is shown in FIGS. 5D and 6D. In this position, no additional outside forces by an operator or some other source have been applied relative to the position shown in FIGS. 5C and 6C. The difference between the continued engagement position and the end position is that a sufficient or threshold duration of time has elapsed after the last activation of the tool. In the end position, the actuation lever 230 has rotated back to its starting position. The downwardly extending block 320 remains held in position as shown, out of contact with the rear tab portion 240. The actuation lever spring 250 causes the actuation lever 230 to rotate back to the starting position, albeit in a slowed manner due to the damper mechanism 290. As noted above, the damper mechanism 290 and actuation lever spring 250 in part control the rate of movement or rate of rotation of the actuation lever 230. In the end position, the actuation lever 230 is no longer in contact with the valve stem 302, meaning that the operator must let go of the trigger 210 or reset the trigger 210 to re-enter the initial engagement position and/or continued engagement position for further fasteners to be driven.

When the operator releases the trigger assembly 102, the bottom assembly 200 rotates back to the rest position shown in FIGS. 5A and 6A. The block spring 330 causes the downwardly extending block 320 to slide laterally back to the starting position so that the sequence can be repeated. The operator is then free to re-engage the trigger 210.

Thus, via the components described above, the tool 100 operates in a contact operation mode for a short time, and reverts back to sequential operation mode if a sufficient amount of time elapses between activations. Based on the damper mechanism and spring characteristics, the actuation lever will rotate back to the rest position over time, forcing the operator to release the trigger 210 and re-engage it for further activations of the tool 100.

While particular embodiments of a powered fastener-driving tool have been described herein, it will be appreciated by those skilled in the art that changes and modifications may be made thereto without departing from the invention in its broader aspects and as set forth in the following claims.

The invention claimed is:

1. A method of operating a fastener driving tool including a workpiece contact element and a trigger assembly including a pivotable trigger, a ramp attached to the pivotable trigger, an actuation lever, a block configured to engage the actuation lever and the ramp to move the actuation lever from a first lever position to a second lever position, and a block spring that biases the block toward a first block position, said method comprising:

- responsive to a first actuation of the trigger prior to actuation of the workpiece contact element, causing the fastener driving tool to operate in a contact actuation mode in which the actuation lever is in the second lever position and the block is in a second block position for a predetermined period;
- in the contact actuation mode during the predetermined period, responsive to actuation of the workpiece contact element, causing the fastener driving tool to drive a fastener from a fastener supply and to reset the predetermined period;
- in the contact actuation mode, responsive the predetermined period elapsing without actuation of the workpiece contact element, causing the fastener driving tool to switch from the contact actuation mode to a sequential actuation mode; and
- in the sequential actuation mode, responsive to actuation of the workpiece contact element and a subsequent actuation of the trigger, causing the fastener driving tool to drive a fastener from the fastener supply.

2. The method of claim 1, wherein the first actuation of the trigger includes depressing the trigger.

3. The method of claim 1, wherein the first actuation of the trigger includes depressing and holding down the trigger.

4. The method of claim 1, wherein prior to the first actuation of the trigger, causing the fastener driving to operate in the sequential actuation mode, which includes, responsive to actuation of the workpiece contact element and a subsequent actuation of the trigger, causing the fastener driving tool to drive a fastener from the fastener supply.

5. The method of claim 1, wherein the predetermined period is a predetermined time period.

6. A method of operating a fastener driving tool including a workpiece contact element and a trigger assembly including a pivotable trigger, a ramp attached to the pivotable trigger, an actuation lever, a block configured to engage the actuation lever and the ramp to move the actuation lever from a first lever position to a second lever position, and a block spring that biases the block toward a first block position, said method comprising:

causing the fastener driving tool to operate in the sequential actuation mode, which includes, responsive to actuation of the workpiece contact element and a subsequent actuation of the trigger, causing the fastener driving tool to drive a fastener;

thereafter, responsive to a subsequent actuation of the trigger prior to actuation of the workpiece contact element, causing the fastener driving tool to operate in a contact actuation mode in which the actuation lever is in the second lever position and the block is in a second block position for a predetermined period;

in the contact actuation mode during the predetermined period and while the trigger continues to be actuated, responsive to actuation of the workpiece contact element, causing the fastener driving tool to drive another fastener and to reset the predetermined period;

in the contact actuation mode, responsive the predetermined period elapsing without actuation of the workpiece contact element, causing the fastener driving tool to switch from the contact actuation mode to the sequential actuation mode; and thereafter, in the sequential actuation mode, responsive to actuation of the workpiece contact element and a further subsequent actuation of the trigger, causing the fastener driving tool to drive another fastener.

7. The method of claim 6, wherein the subsequent actuation of the trigger includes depressing the trigger.

8. The method of claim 6, wherein the subsequent actuation of the trigger includes depressing and holding down the trigger.

9. The method of claim 6, wherein the predetermined period is a predetermined time period.

10. A method of operating a fastener driving tool including a workpiece contact element and a trigger assembly including a pivotable trigger, a ramp attached to the pivotable trigger, an actuation lever, a block configured to engage the actuation lever and the ramp to move the actuation lever from a first lever position to a second lever position, and a block spring that biases the block toward a first block position, said method comprising:

responsive to a holding down the trigger prior to actuation of the workpiece contact element, causing the fastener driving tool to operate in a contact actuation mode in which the actuation lever is in the second lever position and the block is in a second block position for a predetermined period;

in the contact actuation mode during the predetermined period, responsive to actuation of the workpiece contact element, causing the fastener driving tool to drive a fastener and to reset the predetermined period;

in the contact actuation mode, responsive the predetermined period elapsing without actuation of the workpiece contact element, causing the fastener driving tool to switch from the contact actuation mode to a sequential actuation mode; and in the sequential actuation mode, responsive to actuation of the workpiece contact element and a subsequent actuation of the trigger, causing the fastener driving tool to drive another fastener.

11. The method of claim 10, wherein prior to holding down the trigger prior to actuation of the workpiece contact element, causing the fastener driving to operate in the sequential actuation mode.

12. The method of claim 10, wherein the predetermined period is a predetermined time period.

* * * * *